United States Patent
Buda et al.

(10) Patent No.: US 11,194,809 B2
(45) Date of Patent: Dec. 7, 2021

(54) PREDICTING PERFORMANCE OF DATABASE QUERIES

(71) Applicant: International Business Machines Corporation, Armonk, NY (US)

(72) Inventors: Teodora S. Buda, Dublin (IE); John V. Delaney, Kildalkey (IE); Dmitri Lerko, Balbriggan (IE); Francesco Mariani, Mulhuddart (IE); David O'Grady, Maynooth (IE); Clea A. Zolotow, Key West, FL (US)

(73) Assignee: International Business Machines Corporation, Armonk, NY (US)

( * ) Notice: Subject to any disclaimer, the term of this patent is extended or adjusted under 35 U.S.C. 154(b) by 785 days.

(21) Appl. No.: 15/367,406

(22) Filed: Dec. 2, 2016

(65) Prior Publication Data
US 2018/0157978 A1    Jun. 7, 2018

(51) Int. Cl.
*G06F 16/2455*    (2019.01)
*G06N 20/00*    (2019.01)

(52) U.S. Cl.
CPC ......... *G06F 16/2455* (2019.01); *G06N 20/00* (2019.01)

(58) Field of Classification Search
CPC ..... G06T 7/0012; G06T 11/00; G06T 11/003; G06T 2200/04; G06T 2207/10068; G06T 2207/10101; G06T 2207/30101; G06T 7/194; G06T 7/70; G06T 19/006; G06T 2207/10081; G06T 2207/30008; G06T 5/50; G06T 7/40; G06T 7/593; G06T 7/60; G06F 16/2455; G06N 20/00
See application file for complete search history.

(56) References Cited

U.S. PATENT DOCUMENTS

| | | | |
|---|---|---|---|
| 5,091,852 A * | 2/1992 | Tsuchida | ........... G06F 16/24549 |
| 6,272,487 B1 | 8/2001 | Beavin et al. | |
| 6,477,523 B1 | 11/2002 | Chiang | |
| 7,010,516 B2 | 3/2006 | Leslie | |
| 7,249,120 B2 | 7/2007 | Bruno et al. | |
| 7,636,707 B2 | 12/2009 | Chaudhuri et al. | |
| 8,024,286 B2 | 9/2011 | Au et al. | |
| 8,682,875 B2 | 3/2014 | Barsness et al. | |
| 8,688,682 B2 | 4/2014 | Faunce | |

(Continued)

OTHER PUBLICATIONS

Kapoor, Ridhi et al., Selectivity & Cost Estimates in Query Optimization in Distributed Databases, Jun. 2013, International Journal of Enhanced Research in Management & Computer Applications, ISSN:2319-7471 vol. 2 Issue 6 (Year: 2013).*

(Continued)

*Primary Examiner* — Ann J Lo
*Assistant Examiner* — Charles C Kuo
(74) *Attorney, Agent, or Firm* — Stephen J. Walder, Jr.; Steven Bounight

(57) ABSTRACT

A mechanism is provided for determining a predicted performance of a database com. A first model for a database is determined using machine learning and training data based on monitoring the database operating in a production environment. A second model for the database is determined by combining the first model and a knee of curve formula for the database. The second model is stored for use in determining the predicted performance of the database in response to a database query.

20 Claims, 9 Drawing Sheets

(56) References Cited

U.S. PATENT DOCUMENTS

| | | | | |
|---|---|---|---|---|
| 9,026,624 | B2* | 5/2015 | Gusev | G06F 9/5011 |
| | | | | 709/220 |
| 2003/0115212 | A1 | 6/2003 | Hornibrook et al. | |
| 2011/0288847 | A1 | 11/2011 | Narayanan et al. | |
| 2013/0013586 | A1 | 1/2013 | Muras et al. | |
| 2015/0066972 | A1* | 3/2015 | Liu | G06F 16/2453 |
| | | | | 707/765 |
| 2015/0317589 | A1* | 11/2015 | Anderson | G06Q 10/08 |
| | | | | 705/7.25 |

OTHER PUBLICATIONS

"Over $1.7 Trillion Lost Per Year from Data Loss and Downtime According to Global IT Study", EMC Corporation, http://www.emc.com/about/news/press/2014/20141202-01.htm, Newsroom, Press Release, Dec. 2, 2014, 2 pages.

"Selectivity in SQL Databases", Programmer Interview, http://www.programmerinterview.com/index.php/database-sql/selectivity-in-sql-databases, Programmer Job Board, Retrieved from the internet Nov. 8, 2016, 15 pages.

Gruenheid, Anja et al., "Query Optimization Using Column Statistics in Hive", ACM, IDEAS11, Lisbon, Portugal, Sep. 21-23, 2011, 9 pages.

\* cited by examiner

PREDICTING PERFORMANCE OF DATABASE QUERIES

BACKGROUND

The present disclosure relates generally to databases and database management, and, more specifically, to mechanisms for predicting performance of database queries.

Queries of a relational database comprising data tables having rows and columns, such as queries using Structured Query Language (SQL), are typically defined and written during application development for a particular purpose such as a business goal. For example, regular business reports may be produced using data returned by the database in response to the SQL query at periodic intervals. The performance, including resource utilization and run time, of a particular SQL query has an impact on the overall performance of the database and may additionally impact on other related systems. For example, a SQL query with high Central Processing Unit (CPU) utilization and/or high run time (i.e., execution time) may consume a large amount of CPU time and processing resources, which, during the query run time, are not available to other queries thereby reducing the response rate of the database. In addition, if CPU utilization by a SQL query exceeds a critical level known as "CPU saturation", the database and/or application may fail, leading to performance problems including potential data losses and/or potential database and related system outages. In the present disclosure, unless otherwise stated, the term "CPU utilization" refers to the amount of CPU processing resource used, which may be expressed as a percentage, and the term "CPU saturation" refers to a critical or maximum level of CPU utilization.

It is difficult for application developers to understand the performance impact of a new SQL query in a production environment (e.g., a business database system storing real-world data records). In particular, testing of a new SQL query is performed in a test/development environment, which typically uses replica database systems (i.e., replica hardware, software and/or firmware) and mock data sets that are unlikely to accurately represent the actual production environment. Thus, whilst a new SQL query may appear to perform well in a test/development environment, performance issues may arise when the SQL query is deployed into the production environment. In consequence, data losses, database and/or application performance issues and outages may arise, and additional system maintenance may be required. Moreover, development resources, including development and testing time and costs, are considerably increased by the need to roll-back the release of the application including the new SQL query and to develop a replacement SQL query that performs satisfactorily.

Methods for optimizing the performance of database queries have been suggested. For example, U.S. Pat. No. 8,682,875 entitled: "Database Statistics for Optimization of Database Queries Containing User-Defined Functions" proposes a method for optimizing a database query contained user-defined functions. The method receives the database query containing an input and a user-defined function, retrieves statistics describing the user-defined function, and selects a query plan for executing the database query based on the statistics. The statistics retrieved include a hash table relating input values to output values of previous instances of executing the user-defined function and the query plan is selected based on whether a cardinality of the hash table is greater than or equal to or less than a threshold. In this way, more efficient query plans are selected for executing database queries to improve system performance.

However, whilst existing techniques evaluate database statistics for optimizing a database query, for example by selecting a most efficient query plan for use during execution of the query, they are unable to estimate the performance impact of running a query on a database in a production environment. Thus, existing techniques for development of new database queries are unable to address the aforementioned performance issues, including the potential for exceeding CPU saturation (i.e., CPU critical level), and consequential problems arising from queries in the production environment.

SUMMARY

According to an aspect of the present disclosure, a method is provided. The method determines a first model for a database. The first model is determined using machine learning and training data based on monitoring the database operating in a production environment. The method further determines a second model for the database. The second model combines the first model and a knee of curve formula for the database. The method stores the second model for use in determining a predicted performance of the database in response to a database query.

Thus, the method determines a model for the database, based on database statistics and performance in the production environment, which can be used to predict performance issues that may arise with new queries. By combining machine learning modeling with forecasting using the knee of curve formula, CPU saturation may be more accurately and/or reliably predicted.

According to example implementations of the method of the present disclosure, the training data comprises values of predefined model input features and model output features. The values of the model input and output features may be determined by monitoring the database when executing database queries in the production environment. Example model input features include one or more of: cardinality; selectivity; column indexing; column count for columns accessed; row count for rows returned; table density; subquery count; selection predicates count; where clause predicates count; join predicates count; sort columns count, and aggregation columns count. Example model output features include one or more of: CPU utilization, and whether CPU saturation is reached.

By using model input features that impact on CPU utilization, such as the selectivity of a column index and the number of rows accessed, for a database query and by providing monitored values of the input features to the first model, it is possible to more accurately and/or reliably predict database performance, such as CPU utilization and CPU saturation, when executing the database query.

According to example implementations of the method of the present disclosure, the method may apply the first model to a database query to determine a predicted output feature value by the first model. The method may compare the predicted output feature value by the first model with an equivalent actual feature value determined by monitoring the database in the production environment in response to the database query. The method may determine an accuracy of prediction by the first model based on the comparison.

According to example implementations of the method of the present disclosure, a knee of curve formula for the database may be applied, for the database query, for determining a predicted output feature value by knee of curve forecasting. The method may compare the predicted output feature value by knee of curve forecasting with an equivalent actual feature value determined by monitoring the database in the production environment in response to the database query. An accuracy of prediction by the knee of curve forecasting may be determined based on the comparison. In example implementations, the knee of curve formula for the database applied may be determined based on the selectivity of a column indexed by the database query.

According to example implementations of the method of the present disclosure, the second model may be determined based on the accuracy of prediction by the first model, the accuracy of prediction by the knee of curve forecasting, or both.

Thus, for a particular database query, the second model may determine a most accurate prediction method between the use of the first model and knee of curve forecasting, or may use a combination of the prediction methods, to derive a more accurate and/or reliable prediction of database performance when executing the database query.

According to example implementations of the method of the present disclosure, predicted performance of the database when executing a new database query may be determined in a test/development environment. In particular, the method may apply the second model to the new database query, wherein the second model applies the first model, a knee of curve formula for the database or both to the new database query according to the columns indexed by the new database query.

Thus, the application developer working in the test/development environment may accurately predict performance (e.g., CPU utilization and CPU saturation) of a database in a production environment when executing a new query, without having access to the database in the production environment. The application developer merely requires statistics for the model input features of the columns of the database in the production environment for use as input values for the second model for the new database query. Such statistics may be provided in any suitable form, such as a replica database accessible to the application developer or as data comprising a simple table of database values and statistics, which may avoid the need for a replica database.

According to another aspect of the present disclosure, a system is provided. The system comprises a database, and a processing unit in communication with the database. The processing unit is configured for determining a first model for the database using machine learning and training data based on monitoring the database operating in a production environment. The processing unit is further configured for determining a second model for the database, wherein the second model combines the first model and knee of curve formulae for the database. The processing unit is further configured for storing the second model for use in determining a predicted performance of the database in response to a database query.

According to yet another aspect of the present disclosure, a computer program product is provided. The computer program product comprises a computer readable storage medium having program instructions embodied therewith. The program instructions are executable by a processor to cause the processor to: determine a first model for a database using machine learning and training data based on monitoring the database operating in a production environment; determine a second model for the database, wherein the second model combines the first model and knee of curve formulae for the database, and store the second model for use in determining a predicted performance of the database in response to a database query.

BRIEF DESCRIPTION OF THE DRAWINGS

Example implementations of the present disclosure will be described below with reference to the following drawings, in which.

DETAILED DESCRIPTION

The following description relates to the prediction of the performance of queries of a relational database, such as queries using structured query language (SQL). In particular, a SQL query may be defined and written during application development in a test/development environment.

In a relational database, performance issues are often experienced in the database and application layers when SQL query selectivity (the number of different values available in the database) is high. Selectivity is a measure of how many different values are available in a particular column used as an index. A low selectivity value means that there is very little variance (e.g., a column for a variable that has only two values such as "yes" or "no"), whilst a high selectivity value means there is a lot of variance (e.g., a column for a variable that has a large number of different values, such as different last names). Thus, the use of a column with a high selectivity value as an index in a query may lead to high Central Processing Unit (CPU) utilization and the potential for performance issues. However, since the production environment, from which the selectivity values of different columns in the database may be determined, is not available for testing a new query, an application developer is unable to determine the likelihood of performance issues arising when deploying a new query in the production environment. Further details of the impact of selectivity as a database index are provided in the article entitled "Selectivity in SQL Databases."

The present disclosure builds on the field of machine learning, which represents the study of pattern recognition and computational learning theory in artificial intelligence. With the help of machine learning it is possible to model SQL queries and monitor their CPU utilization in a production environment. The model may be used in a test/development environment to predict CPU utilization for a new query based on certain predefined features, such as column selectivity, row count of selected table, and so on, without having access to actual production data (e.g., sensitive user data).

Thus, the present disclosure allows developers to write SQL queries and use a model to accurately estimate the performance impact of the query, even in situations where direct access to enterprise-owned production databases is not possible. Example implementations of the present disclosure are able to determine whether a query is likely to lead to undue CPU utilization or even CPU saturation when deployed in the production environment, in order to assist application developers in verifying and refining new queries during robustness testing in a test/development environment.

Figure 1:
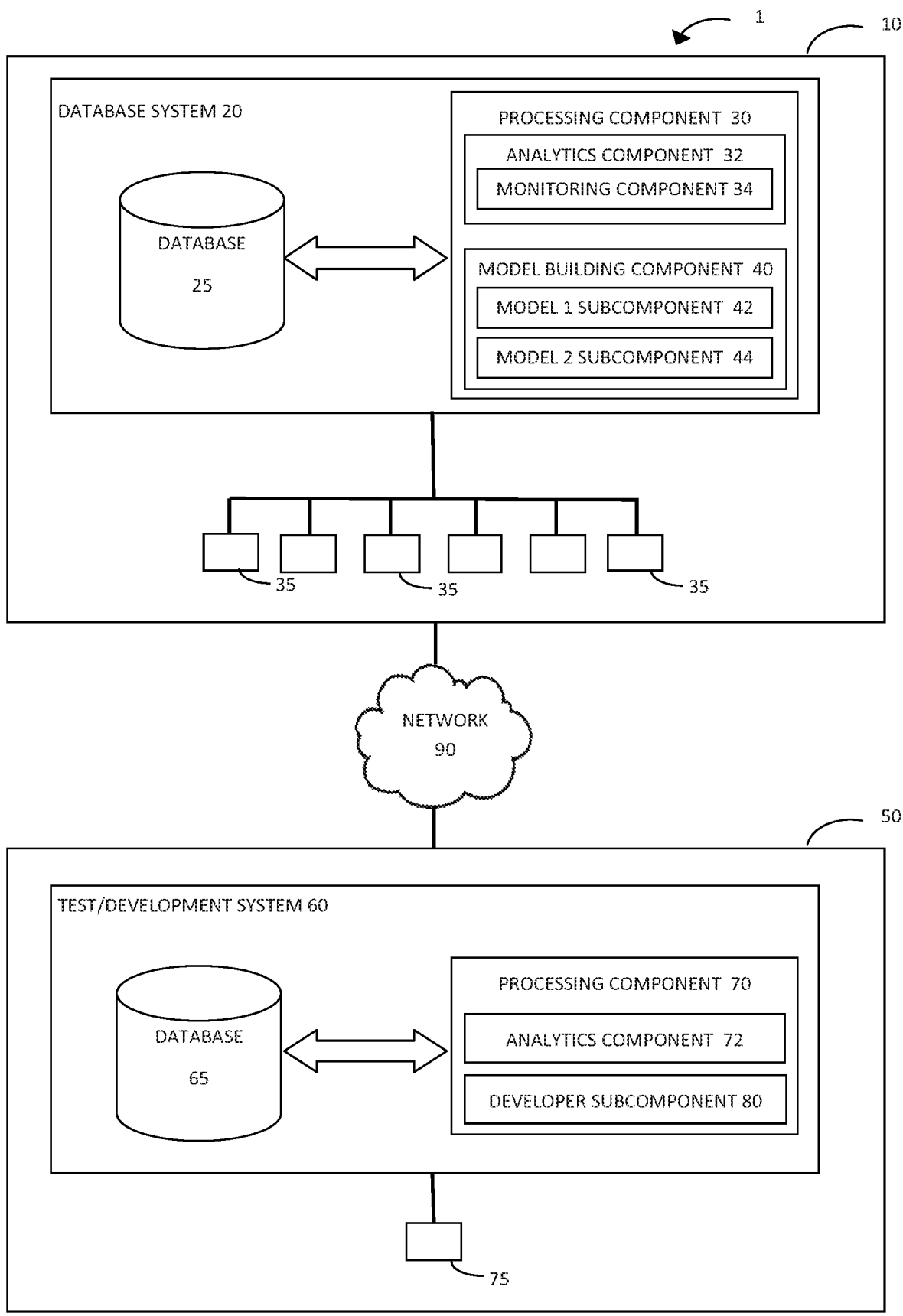
FIG. 1 is a block diagram showing an overview of a system according to example implementations of the present disclosure.

FIG. 1 is a block diagram showing an overview of a system 1 according to example implementations of the present disclosure. The system 1 comprises a production environment 10 including a database system 20. Database system 20 may comprise a database server system, such as the IBM® DB2® database server available from IBM Corporation of Armonk, N.Y., USA. In particular, database system 20 comprises a relational database 25 comprising a database management system (DBMS) for storing data as database records. Database system 20 is accessed by users in the production environment 10 by means of multiple user devices 35, which may run database client applications according to conventional techniques. In particular, a client application may run predefined queries, such as SQL queries, of the database 25 at periodic intervals or otherwise, and the database 25 may provide a results set of database records to the client application in response to the query. Database system 20 further comprises processing component 30 in communication with the database 25. Processing component 30 typically comprises an analytics component 32 including a monitoring component 34 for monitoring the database 25 and for obtaining and storing database statistics relating to the operation of the database 25 and the data stored in the database 25.

System 1 further comprises a test/development environment 50 having a test/development system 60 for testing a database client application in the production environment 10. In particular, test/development system 60 is accessed by an application developer using a user device 75 to test a database client application including one or more new SQL queries, according to conventional development and testing techniques. In accordance with some example implementations of the present disclosure, the test/development system 60 may include a replica database 65 storing duplicate data from the database 25 in the production environment. In other example implementations of the present disclosure, a replica database is not required and instead the test/development system 60 includes a database 65 storing data comprising values and statistics derived from the database 25 in the production environment, as described further below.

In accordance with example implementations of the present disclosure, system 1 further comprises a model building component 40 in communication with the database system 20 including the associated processing component 30, in the production environment 10. In the example implementation shown in FIG. 1, model building component 40 comprises a Model 1 subcomponent 42, for providing a first model of the database system by machine learning techniques. Model building component 40 may further comprise a Model 2 subcomponent 44, for applying the first model and using accuracy prediction techniques for providing a second model of the database system, with improved output prediction accuracy, as described further below.

In accordance with example implementations of the present disclosure, the system 1 additionally comprises an analytics component 720 and a developer subcomponent 80 in communication with the test/development system 60 including an associated processing component 70, for implementing the first and/or second models in order to determine a predicted performance impact of a new database query, in the test/development environment 50, as described further below.

In the system shown in FIG. 1, the production environment 10 is in communication with the test/development environment 50 over a communications network 90, such as the Internet. However, as the skilled person will appreciate, in other example implementations the production environment 10 and the test/development environment 50 may not be interconnected.

Figure 2:
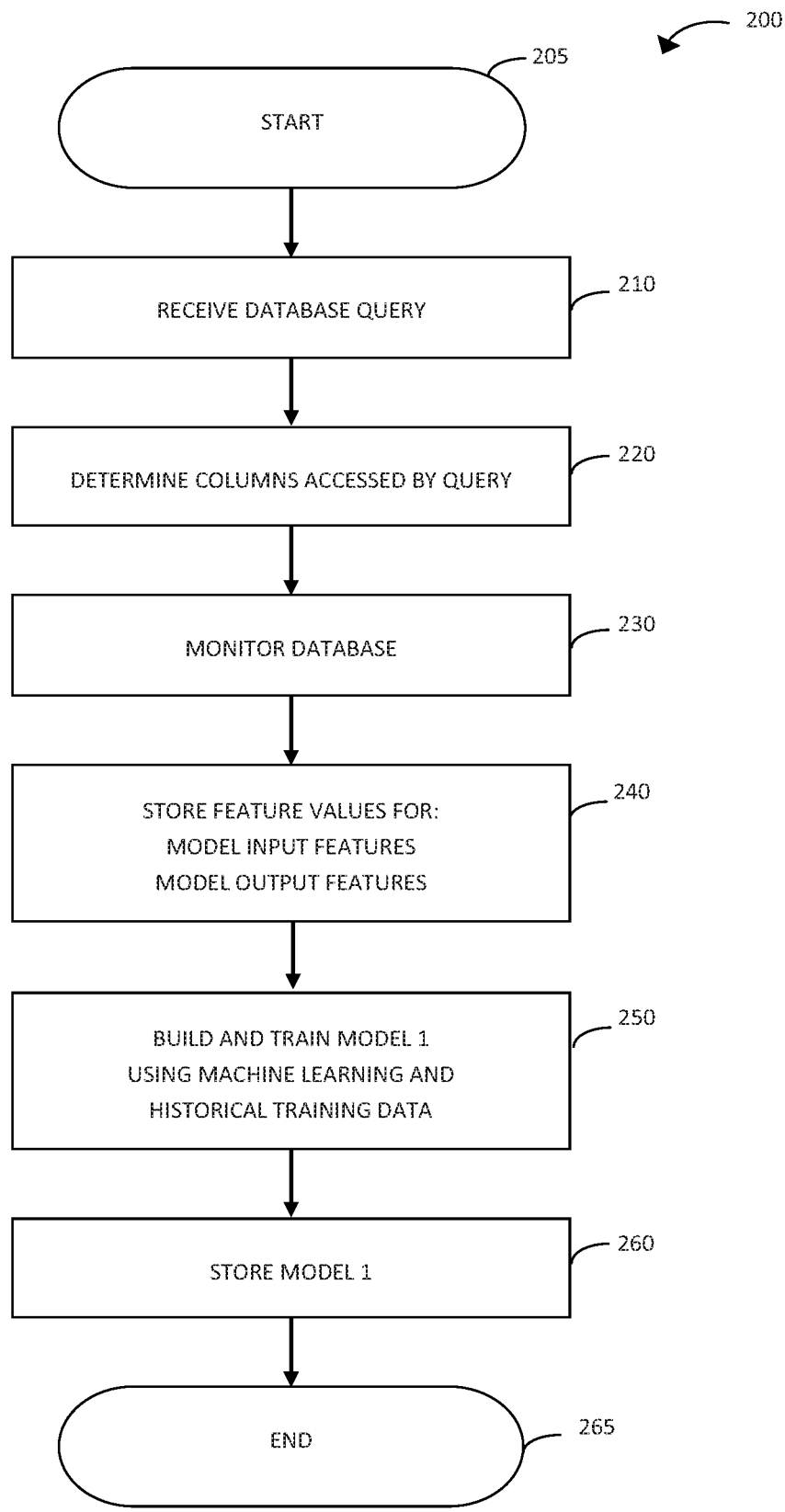
FIG. 2 is a flowchart of method for providing a model for a database in a production environment by machine learning according to an example implementation of the present disclosure.

FIG. 2 is a flowchart illustrating a method 200 according to example implementations of the present disclosure. In particular, although not exclusively, the method 200 may be performed by the processing component 30 (e.g., Model 1 subcomponent 42) of the database system 20 in the production environment 10 of the system of FIG. 1, as described above.

The method starts at 205 and at step 210 receives a database query. For example, the query may comprise a SQL query defining one or more columns C of one or more tables T of database records to be included in the results set of database records from the database in response to the query. Optionally, the SQL query may also define one or more query conditions, such as a value or range of values for one or more columns C. As the skilled person will appreciate, any type of database query that is known or developed in the future is possible and contemplated by the present disclosure. At step 220, the method determines the columns C1 to Cn accessed by the query. For example, step 220 may use a conventional SQL query decomposer, which processes the SQL query and determines the columns C1 to Cn associated with the query. As the skilled person will appreciate, for an indexed database, the columns C1 to Cn are the columns with indices.

At step 230, the method monitors the database in the production environment in order to obtain database feature values and statistics relating to the particular SQL query. For example, step 230 may be performed by conventional database analysis techniques for monitoring the database and obtaining and storing database values and statistics, including database values and statistics associated with columns C1 to Cn. The database values and statistics obtained in step 230 are stored in step 240 for use as input and output features of a machine learning model of the database in the production environment, as described below.

In particular, step 230 determines, for each monitored database query, features associated with the query, for use as inputs to the machine learning model, and features associated with the performance of the database when executing the query, for use as outputs of the machine learning model.

In the example implementation shown in FIG. 2, the model input features may include: (i) the cardinality of each column in a table T(Ci) (ii) the selectivity of columns Ci, and (iii) the columns used as indexes. As the skilled person will appreciate, the values of these features are dependent on the definitions and conditions of the database query and the data stored in the database, which may be determined using database statistics or otherwise. In example implementations, step 230 may receive the identified columns C1 to Cn from step 220, and may identify the respective columns (e.g., by column name). Step 230 may use conventional analysis techniques to retrieve, for each identified column, a value for selectivity, row count, whether it is indexed etc., for use in determining query input features (i) to (iii) as inputs to the machine learning model. Furthermore, step 230 may identify columns C1 to Cn having associated conditions, and may additionally retrieve, for each identified column and condition in combination, a value for selectivity, row count, whether it is indexed etc., for use in determining query input features (i) to (iii) as inputs to the machine learning model. As the skilled person will further appreciate, values of many other features may be used as inputs to the machine learning model, and all such features are possible and contemplated by the present disclosure.

In addition, in the example implementation shown in FIG. 2, step 230 determines, for each monitored database query, the model output (i.e., performance) features (iv) CPU utilization (e.g., expressed as % CPU utilization) and (v) whether CPU saturation is reached (e.g., expressed as yes or no), for use as outputs of the machine learning model. As the skilled person will appreciate, the values of these features may be obtained by monitoring the operation of the CPU whilst executing the query, using conventional techniques.

At step 250, a machine leaning model (called herein "Model 1") is built and trained by machine learning techniques using the determined model inputs and model outputs and training data (e.g., historical data for multiple queries gathered over a period of typically 1 to 12 months). As the skilled person will appreciate, the accuracy of Model 1 is dependent upon the training time and quantity of training data employed. At step 260, the trained machine learning model is stored as Model 1, which provides a model of the database in the production environment. The method then ends at step 265.

As the skilled person will appreciate, Model 1 may be used for determining model outputs comprising one or more predicted performance features (e.g., (iv) CPU utilization and (v) CPU saturation reached (yes/no)) based on one or more model input features (e.g., (i) cardinality, (ii) selectivity, and (iii) indexing of the columns Ci) associated with a new SQL query for the database in the production environment. Thus, Model 1 may be used by an application developer for testing new SQL queries in a test/development environment as discussed above. Since Model 1 is based on database values and statistics from the production environment, the developer is able to more accurately and/or reliably predict the performance impact of a new query in the production environment compared to prediction based on monitoring the execution of the new query by a replica database system in the test/development environment.

As the skilled person will appreciate, the method 200 of FIG. 2 may be performed by a processing component of a database system in a production environment. In particular, the method 200 may be performed by processing component 30 of the database system 20 in the production environment 10 of FIG. 1. For example, steps 210, 220, 230 and 240 of the method 200 may be performed by analytics component 32 (e.g., monitoring component 34), and steps 250 and 260 may be performed by model building component 40 (e.g., Model 1 subcomponent) of the processing component 30 of the database system 20 of FIG. 1. Other suitable implementations of the method 200 of FIG. 2, which will be evident to the skilled person, are possible and contemplated by the present disclosure.

Figure 3:
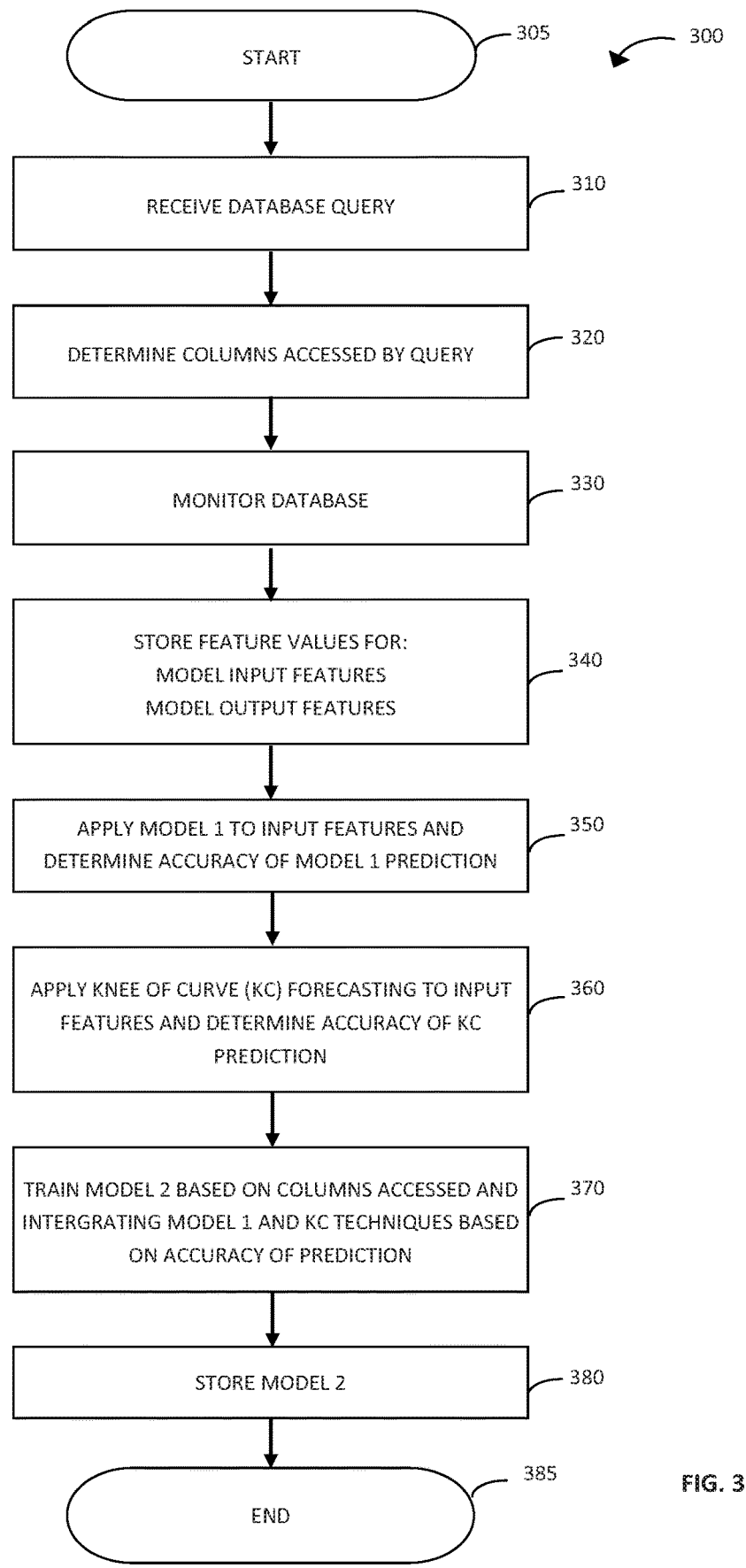
FIG. 3 is a flowchart of a method for providing a model for a database in a production environment by a combination of machine learning and knee of curve techniques according to an example implementation of the present disclosure.

FIG. 3 is a flowchart illustrating a method 300 according to example implementations of the present disclosure. In particular, although not exclusively, the method 300 may be performed by the processing component 30 (e.g., Model 2 subcomponent) of the database system 20 in the production environment 10 of the system of FIG. 1, as described above. The method 300 uses a machine learning model for determining predicted model output features, such as CPU utilization and/or CPU saturation reached (yes/no), based on model input features, such as cardinality, selectivity and indexing, associated with a new SQL query. Such a model may be derived as "Model 1" using the processing component 30 of the database system 20 in the production environment 10 of the system of FIG. 1 and/or the method 200 of FIG. 2, as described above.

The method starts at step 305 and at step 310 receives a database query. For example, the query may comprise a SQL query as described above in relation to step 210. At step 320, the method determines the columns C1 to Cn accessed by the query. For example, as with step 220, step 320 may use a conventional SQL query decomposer, which processes the SQL query and determines the columns C1 to Cn associated with the query.

At step 330, the method monitors the database in the production environment in order to obtain database feature values and statistics relating to the particular SQL query. For example, step 330 may be performed by conventional database analysis techniques for monitoring the database and obtaining and storing database values and statistics, including database values and statistics associated with columns C1 to Cn.

In the example implementation shown in FIG. 3, step 330 determines values for the same model input features ((i), (ii) and (iii)) and model output features ((vi) and (v)) as described above in relation to step 230. As the skilled person will further appreciate, values of other suitable features, for use in accuracy prediction techniques as described below, are possible and contemplated. The method stores the monitored feature values associated with the database query and columns C1 to Cn in step 340.

Step 350 receives the monitored feature values from step 340, and determines the accuracy of prediction for the query using Model 1. In particular, step 350 applies Model 1 to the model input feature values for the query (i.e., features (i), (ii) and/or (iii)) and determines predicted model output feature values (i.e., values of feature (iv) and/or (v)). Step 350 may then compare the predicted values of features (vi) and/or (v) for the query with the actual values of the features (iv) and (v) as determined at step 330 and stored at step 340, and determine the accuracy of the Model 1 prediction. The accuracy may be calculated by step 350 using any suitable technique, such as an actual value, a percentage etc.

Concurrently with step 350, step 360 receives the monitored feature values from step 340, and determines the accuracy of prediction for the query using so-called "knee of curve" (KC) forecasting. Further details of knee of curve forecasting are provided below with reference to FIGS. 4, 5, 6 and 7. In particular step 360 uses a knee of curve formula for the database and the model input feature values (i.e., features (i), (ii) and/or (iii)) and determines predicted model output feature values (i.e., features (iv) and/or (v)) for the query using knee of curve forecasting. Step 350 then compares the predicted values of features (iv) and/or (v) for the query by knee of curve forecasting with the actual values of the features (iv) and (v) as determined at step 330 and stored at step 340, and determines the accuracy of the knee of curve prediction. The accuracy may be calculated by step 360 using any suitable technique, such as an actual value, a percentage etc. As the skilled person will appreciate, step 360 may be performed before or after step 350 as well as concurrently therewith.

At step 370, the method receives the Model 1 prediction accuracy for the query using from step 350, the knee of curve prediction accuracy for the query using from step 360 and the columns C1 to Cn for the query from step 320 and determines an integrated model (called herein "Model 2"), which combines the prediction techniques using Model 1 and knee of curve forecasting. In particular, step 370 uses the prediction accuracy values for the respective Model 1 and knee of curve prediction methods and column values C1 to Cn for queries as training data (e.g., historical data for multiple queries gathered over a period of 1 to 12 months) for determining Model 2. At step 380, the trained machine learning model is stored as Model 3, which provides a model of the database in the production environment. The method then ends at step 385.

In example implementations, Model 2 may combine the Model 1 and knee of curve prediction techniques by selecting, from the two techniques, the most accurate prediction technique according to the columns C1 to Cn of the query for determining the Model 2 output as the performance prediction. In other example implementations, Model 2 may use a weight for each of the Model 1 and knee of curve prediction techniques based on their respective prediction accuracy according to the columns C1 to Cn of the query, and combine the weighted outputs from both techniques for determining the Model 2 output as the performance prediction. Thus, for example, if the knee of curve prediction is more accurate that the Model 1 prediction for columns C1 to Cn of a query, a higher weight (e.g., 80%) may be assigned to the knee of curve prediction and a lower weight (e.g., 20%) may be assigned to the Model 1 prediction, and the Model 2 prediction may be determined as an average of the weighted outputs as the performance prediction. In yet another example implementation, Model 2 may be trained as an ensemble model using machine learning. For instance, the so-called Gradient Boosting Tree (XGBoost library in R can be referenced) may be applied to learn which approach (or combination) is more accurate for particular input features. As the skilled person will appreciate, many other techniques may be used for combining the knee of curve and Model 1 prediction techniques into an integrated model, Model 2. By combining the two prediction methods, Model 2 may provide a more accurate and/or reliable performance prediction (e.g., model output feature values (iv) and (v) discussed above) compared with using only one of the techniques.

As the skilled person will appreciate, Model 2 may be used for determining model outputs comprising one or more predicted performance features (e.g., (iv) CPU utilization and (v) CPU saturation reached (yes/no)) based on one or more model inputs (e.g., (i) cardinality, (ii) selectivity, and (iii) indexing of the columns Ci) associated with a new SQL query for the database in the production environment. Thus, Model 2 may be used by an application developer for testing new SQL queries in a test/development environment as discussed above. Since Model 2 uses database values and statistics from the production environment for both prediction methods used, the developer is able to more accurately and/or reliably predict the performance impact of a new query in the production environment compared to prediction based on monitoring the execution of the new query by a replica database system in the test/development environment.

As the skilled person will appreciate, the method 300 of FIG. 3 may be performed by a processing component of a database system in a production environment. In particular, the method 300 may be performed by processing component 30 of the database system 20 in the production environment 10 of FIG. 1. For example, steps 310, 320, 330 and 340 of the method 300 may be performed by analytics component 32 (e.g., monitoring component 34), and steps 350, 360, 370 and 380 may be performed by model building component 40 (e.g., Model 2 subcomponent) of the processing component 30 of the database system 20 of FIG. 1. Other suitable implementations of the method 300 of FIG. 3, which will be evident to the skilled person, are possible and contemplated by the present disclosure.

Model 2 advantageously combines machine learning prediction, the accuracy of which is dependent upon time (i.e., accuracy increases with training data over a long time period) with knee-of-the-curve prediction, the accuracy of which is independent of time, to deliver highest available accuracy forecasting at all times.

As the skilled person will further appreciate, various changes may be made to the machine learning methods of FIGS. 2 and 3 for modeling the database in the production environment. For example, any suitable model input and output features may be used. Generally, model input features are features of the database query that impact the amount of processing resource and/or processing time required, and model output features are features of the performance of the database in executing the query. Thus, whilst the description primarily refers to the model input features: (i) cardinality, (ii) selectivity, and (iii) indexing of the columns Ci, which are considered beneficial, although not essential, for building the described models, many other additional or alternative model input features may be used. Such features include, without limitation: number of columns Ci accessed by the query (column count for columns accessed); number of rows returned when accessing a column Ci (row count for rows returned), density of table T accessed by the query (table density); number of nested subqueries forming part of the query (subquery count); total number of selection predicates of the query (selection predicates count); number of where clause predicates of the query (where clause predicates count); total number of join predicates of the query (join predicates count); number of sort columns of the query (sort columns count), and number of aggregation columns of the query (aggregation columns count). Moreover, the present disclosure is not limited to databases that use an index methodology. Thus, model input and model output features are not limited to features that relate to indexing.

Figure 4:
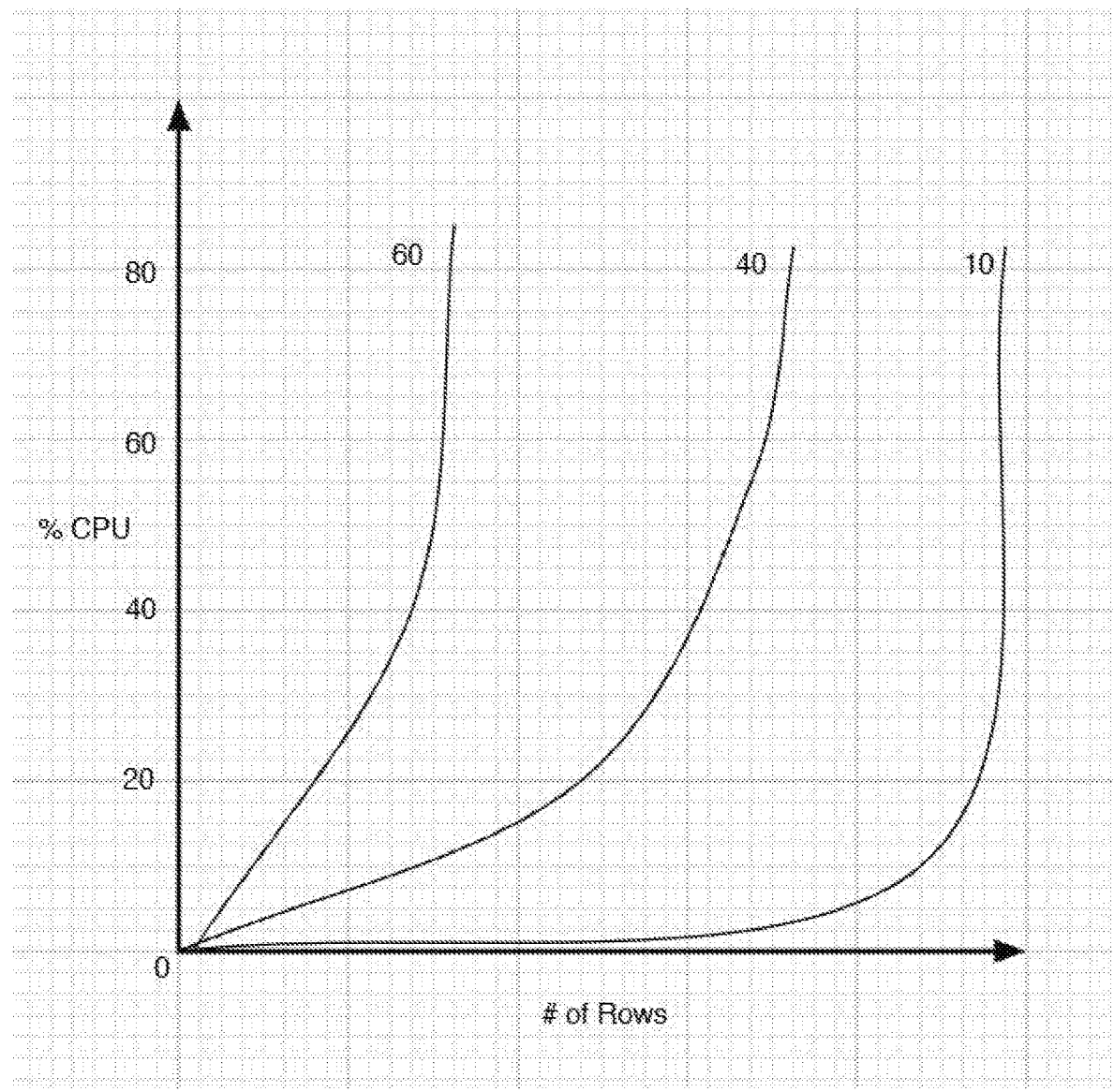
FIG. 4 is an exemplary schematic graph of CPU utilization versus number of rows of a database showing knee of curve formulae for database queries with different values of column selectivity.

FIG. 4 is an example graph of characteristic curves for CPU utilization versus number of database rows, for use in illustrating the so-called "knee of curve" forecasting formula for database queries. FIG. 4 shows three characteristic curves, each representing a different column index selectivity value for a query, namely 60% selectivity (curve labeled "60"), 40% selectivity (curve labeled "40") and 10% selectivity (curve labeled ("10"). As shown in FIG. 4, the shape of the characteristic curve, and the position of the so-called "knee point" thereof, shifts with column selectivity. Thus, at 10% selectivity, CPU utilization is substantially constant up to the knee point beyond which it increases exponentially, such that the curve has substantially straight lines with a substantially 900 angle at the knee point, which is located at a position along the x axis corresponding to a relatively high number of rows. In contrast, at 60% selectivity, CPU utilization starts at a higher level and increases more steeply up to the knee point beyond which it increases exponentially, such that the curve has greater curvature around the knee point, which is shifted to a lower position along the x axis corresponding to a lower number of rows. Thus, it can be seen that the higher selectivity, the steeper and more curved the line becomes and the sooner CPU saturation (i.e., CPU critical level) is reached (i.e., the knee of the curve is at a lower number of rows). As the skilled person will appreciate, for a particular database system, the characteristic curves of CPU utilization versus number of rows, at different selectivity values, may be readily derived. For example, CPU utilization may be monitored for multiple different queries with different column indexes selectivity values and the resulting points for each selectivity value may be extrapolated, or otherwise processed, to determine the corresponding characteristic curve. Furthermore, as the skilled person will appreciate, a knee of curve formula (KC formula) for queries of a database system may be determined, for predicting the position of the knee point of the characteristic curve for a particular selectivity value. An example of such a method is described below with reference to FIG. 7.

Figure 5A:
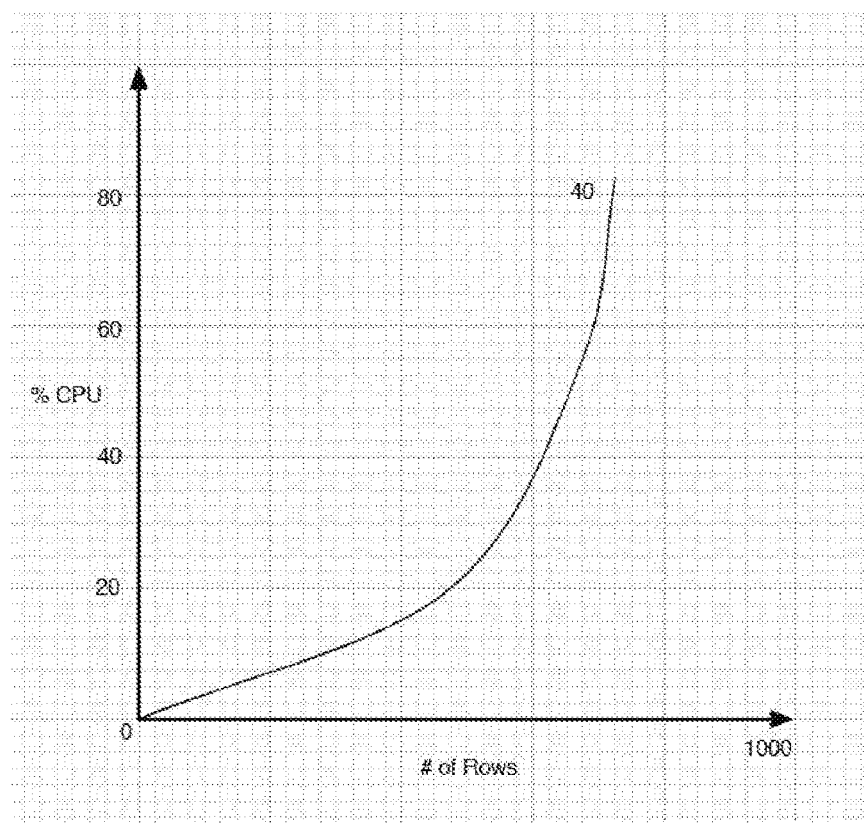
FIGS. 5A and 5B are exemplary schematic graphs of CPU utilization versus number of rows of a database showing an example knee of curve formula for database queries having the same column selectivity in a test database and a production database, respectively.
Figure 5B:
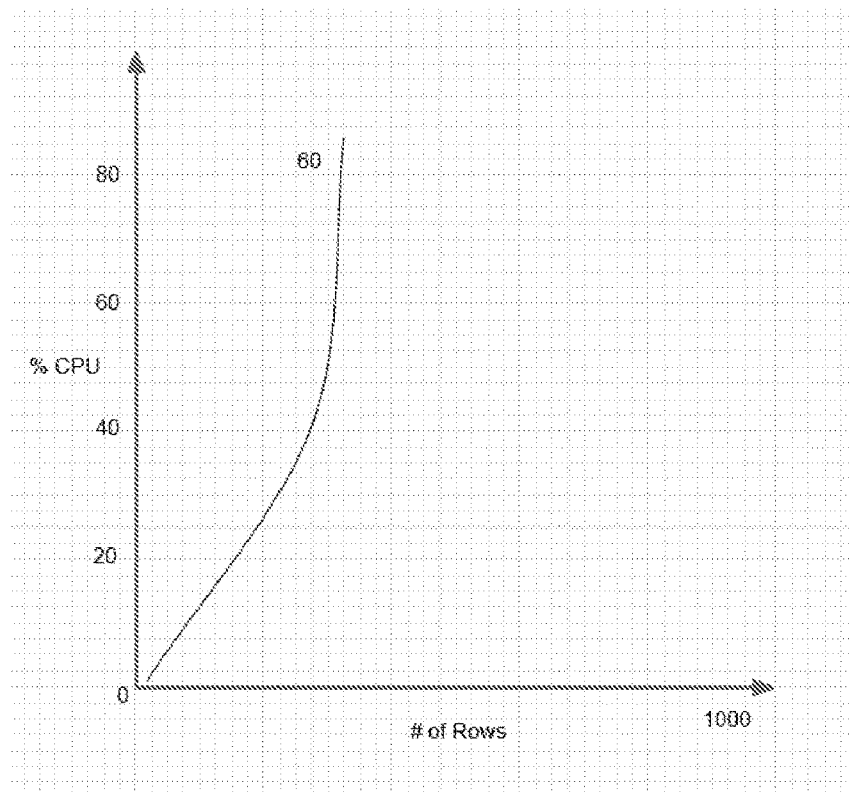

Assume that a database query is executed on a test database (e.g., replica database) in a test/development environment, such as the database 65 of the test/development system 60 shown in FIG. 1, where the query specifies a column index with a selectivity of 40% and relates to 1000 rows, corresponding to the total number of rows in the test database. FIG. 5A is a graph, similar to the graph of FIG. 4, showing an example of a characteristic curve for 40% selectivity, and thus applicable in this scenario, which may be used by an application developer in knee of curve forecasting to determine whether the query is likely to lead to CPU saturation. However, as discussed above, a replica database in a test/development environment may not accurately replicate the actual database in the production environment. For instance, assume that, in the database in the production environment, the actual column index selectivity is 60% and the actual number of rows is 10,000 for the database query. This scenario is shown in FIG. 5B, where the characteristic curve for 60% selectivity is steeper and the knee point is at a lower number of rows. Comparing FIGS. 5A and 5B, it can be seen that CPU saturation may be reached when executing the query in the production environment, but is not predicted in the test/development environment (i.e., due to the knee point in FIG. 5B being at a lower number of rows that the knee point in FIG. 5A). Thus, the use of knee of curve forecasting in the test/development environment may lead to inaccurate forecasting, as discussed above.

Figure 6A:
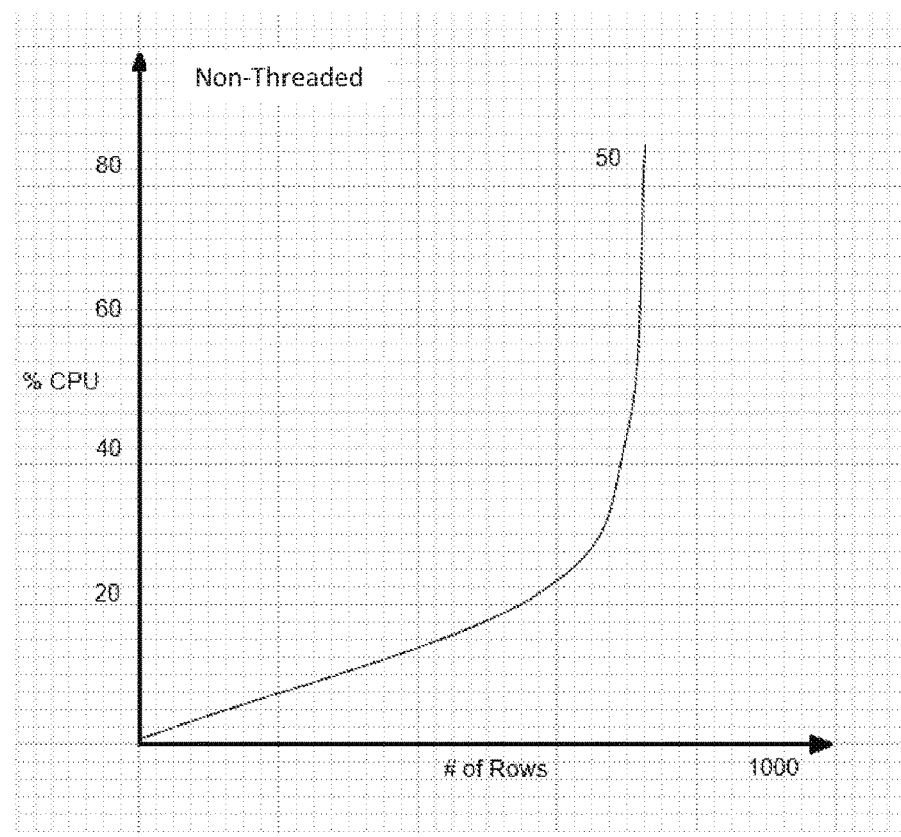
FIGS. 6A and 6B are exemplary schematic graphs of CPU utilization versus number of rows of a database showing an example knee of curve formula of a single threaded approach and a multithreaded approach, respectively.
Figure 6B:
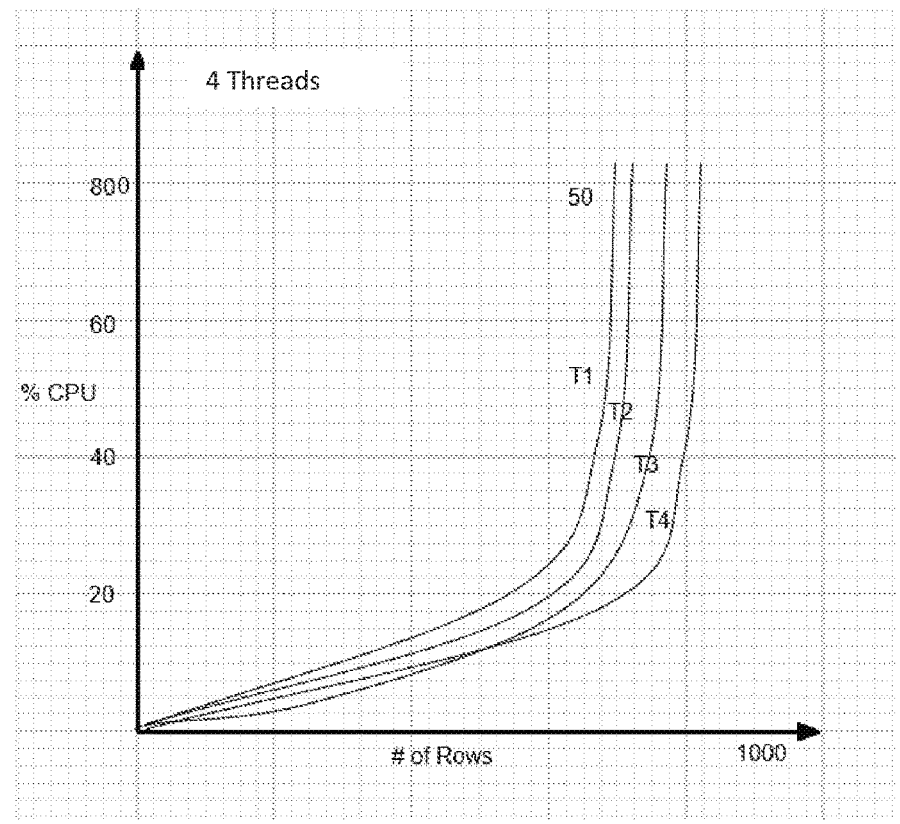

Conventionally, processing associated with SQL query indices are not able to be multi-threaded. Thus, a single CPU engine performs all the processing associated with a particular query. However, developments in SQL processing may provide a multi-threaded capability for execution of SQL queries, in order to spread the processing load across multiple CPU engines. FIG. 6A is a graph, similar to FIG. 4, showing a curve for query with a column index having a selectivity of 50. FIG. 6B is a corresponding graph showing the impact of multi-threading of the processing of the query across multiple CPU engines. In particular, FIG. 6B shows how the query may be processed in multiple threads by four CPU engines processing corresponding separate workloads T1 to T4. As shown in FIG. 6B, each of the four curves is less steep and has a knee point at a higher number or rows that the single curve shown in FIG. 6B. According to example implementations of the present disclosure, formulae for knee of curve forecasting for a multi-threaded approach may be determined and used for scenarios in which the database in the production environment has multi-threaded capability. Thus, for example, step 360 of the method of FIG. 3 may use one or more of multiple curves for multiple threads when applying knee of curve forecasting in order to determine a most accurate knee of curve prediction. For example, an average of the curves for the multiple threads may be used.

Figure 7:
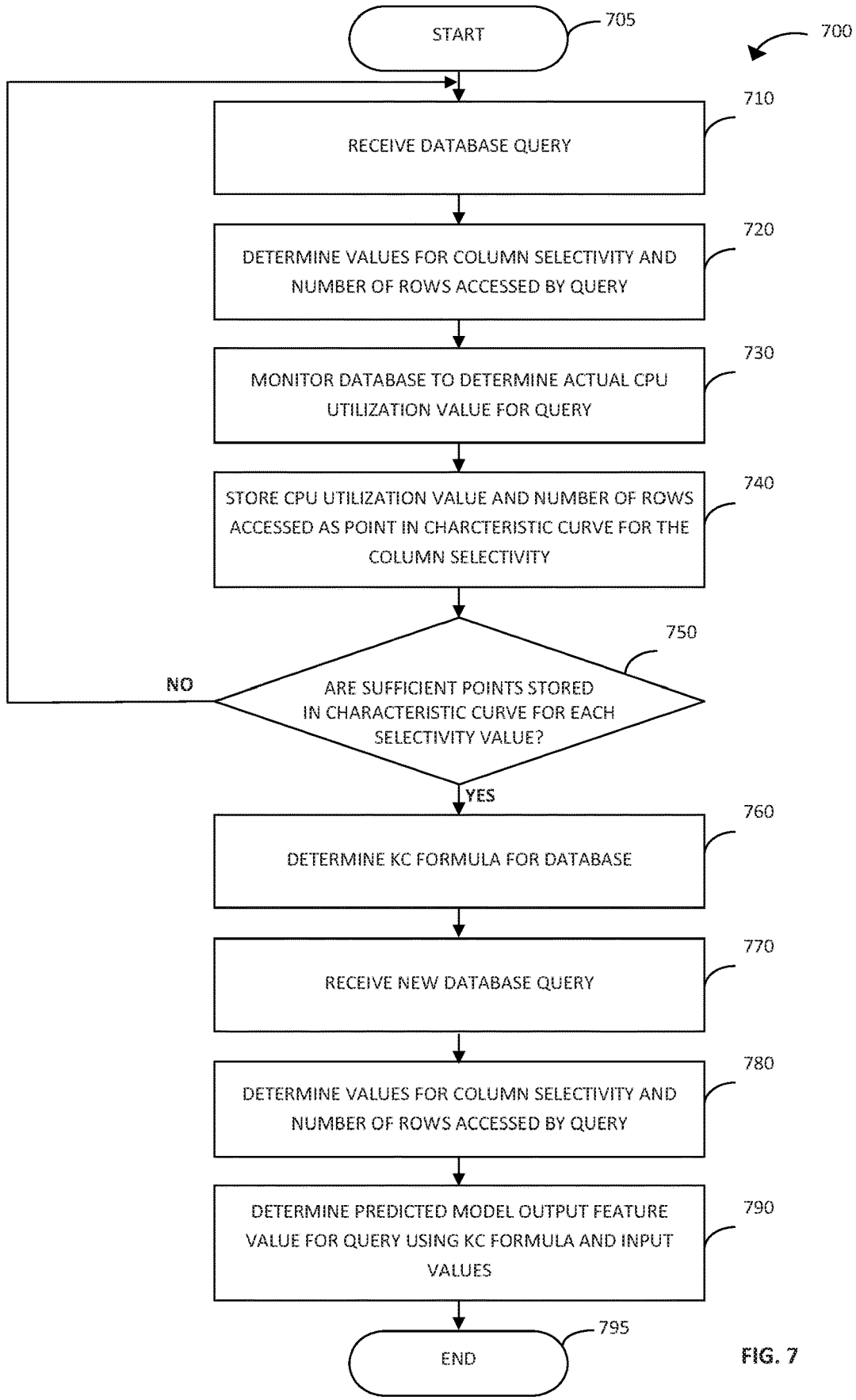
FIG. 7 is a flowchart of a method for knee of curve forecasting according to an example implementation of the present disclosure.

FIG. 7 is a flowchart illustrating a method according to example implementations of the present disclosure. In particular, although not exclusively, the method may be performed by the processing component 30 (e.g., Model 2 subcomponent) of the database system 20 in the production environment 10 of the system of FIG. 1 described above. The method 700 uses values of model input features for a database query and corresponding actual values of model output features to derive characteristic curves for CPU utilization versus number of rows for multiple selectivity values for a database system, where the model input and output features may correspond to those of Model 1, as described above. The method 700 may further determine a knee of curve formula to perform knee of curve forecasting, e.g., to determine a location of knee point on a characteristic curve for a selectivity value. The KC formula may be used in order to predict the value of a model output feature based on the values of model input features for a database query. The method 700 may be used independently of the methods of FIGS. 2 and 3 or may be used as part of step 360 of the method 300 of FIG. 3 described above.

The method 700 starts at step 705. In particular, the method may start in response to identifying a need to determine a knee of curve formula for a database system in a production environment. The method 700 initially monitors the database system in order to obtain database feature values and statistics relating to SQL queries. At step 710, the method receives a database query (e.g., SQL query) and at step 720 determines feature values for the query, including values for column selectivity and number of rows accessed by the query. For example, steps 710 and 720 may be performed by conventional database analysis techniques for monitoring the database and obtaining and storing database values and statistics for a SQL query.

At step 730 the method monitors the database system, and in particular the CPU thereof, and determines a value of CPU utilization for the query. Optionally, the method may determine whether CPU saturation is reached (yes/no) by the query. As the skilled person will appreciate, the value of CPU utilization for the query may be determined indirectly from database values and statistics derived using conventional analysis techniques for monitoring a database as described above. At step 740, the method stores the determined data for the query, and, in particular, stores the CPU utilization value and the number of rows as a point in the characteristic curve of the database system for the column selectivity value.

At step 750, the method considers whether the stored data includes sufficient data entries, corresponding to points in the characteristic curve, for each of a plurality of selectivity values. For example, the method 700 may determine knee of curve formula for a plurality of predetermined selectivity values, such as characteristic curves for selectivity values of 10, 40 and 60 as shown in FIG. 4. In order to determine a characteristic curve for a particular selectivity value, a minimum number and/or spread of points on the curve are required in order to effectively and accurately extrapolate the points to accurately represent the curve. This minimum threshold number of points may dependent upon the technique used for determining the characteristic from the points and/or the desired accuracy required, and so may be predefined according to application requirements. It should be noted that, in order to determine a knee of curve formula for knee of curve forecasting, (e.g., for predicting the knee point of a characteristic curve for an arbitrary selectivity value), the characteristic curves for a minimum number and/or spread of selectivity values are required, which may be determined and stored as the plurality of predetermined selectivity values according to application requirements. Thus, step 750 may compare the number of data entries for the (or each) selectivity value with the minimum threshold, in order to determine whether the stored data includes sufficient data entries for a curve for the (or each) selectivity value. Step 750 may further consider whether the spread of data entries across the range (e.g., number of rows) is sufficient for a curve for the (or each) selectivity value. If step 750 determines that there are not sufficient data entries or the spread of data entries is insufficient, the method returns to step 710 and continues to monitor database queries, using steps 710 to 740, until step 750 determines that the stored data has sufficient data entries for determining the knee of curve formulae for each selectivity value. Otherwise, the method proceeds to step 760.

At step 760, the method determines the knee of curve formula for the database system based on the stored characteristic curves for the plurality of selectivity values using any suitable technique. The determined knee of curve formulae may be stored and/or communicated for use by another method. For example, the knee of curve formulae may be used in the method of FIG. 3, including step 360 of determining an accuracy of the knee of curve prediction and thus combined into Model 2 as described above.

However, in accordance with the method 700 of FIG. 7, the knee of curve formulae may be used for knee of curve forecasting, i.e., for determining the knee point in relation to a particular query, in a test/development environment using steps 770 to 790 as described below. In particular, step 770 may receive a new database query. For example, the query may comprise a new SQL query as described above in relation to step 210, written by an application developer for use in a database in a production environment.

At step 780, the method determines values for column selectivity and number of rows associated with the new database query. In particular, the method may access memory containing a table of statistics for columns of the production database, to determine the values, or may determine the values using a replica database. At step 790, the method determines the predicted CPU utilization for the query, and optionally whether CPU saturation is predicted to be reached (yes/no) for the query, by applying the knee of curve formula using the corresponding selectivity value and the number of rows. As the skilled person will appreciate, the KC formula determines the shift of the knee point of the characteristic curve for the selectivity value, where the knee point indicates the number of rows above which CPU utilization increases rapidly leading to CPU saturation. Thus, the KC formula may be used to predict CPU utilization for the query based on the determined knee point from the shifted characteristic curve. The method then ends at step 795.

As the skilled person will appreciate, FIG. 7 illustrates just one suitable method for analyzing characteristics of a database system for use in knee of curve forecasting. Many other methods for determining formulae and/or algorithms for knee of curve forecasting of database performance in relation to queries of a database system now known or developed in the future are possible and contemplated by the present disclosure.

Figure 8:
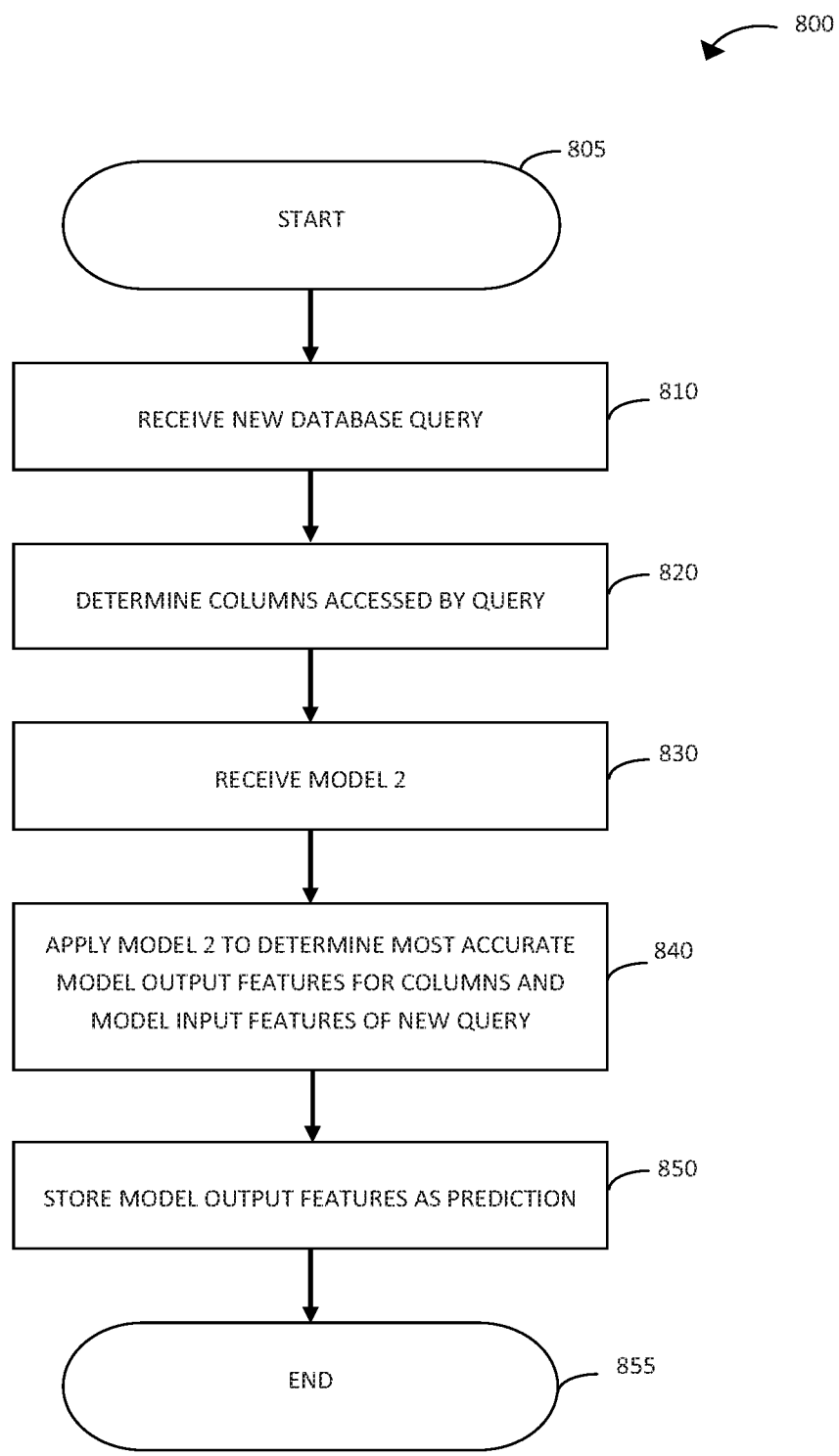
FIG. 8 is a flowchart of a method for applying a model in a test/development environment according to an example implementation of the present disclosure.

FIG. 8 is a flowchart illustrating a method 800 according to example implementations of the present disclosure. In particular, although not exclusively, the method 800 may be performed by the processing component 70 (e.g., developer subcomponent 80) of the test/development system 60 in the test/development environment 50 of the system of FIG. 1, as described above. In the example implementations of FIG. 8, the method 800 uses an integrated model that combines a machine learning model of the database in the production environment with knee of curve forecasting for determining predicted values of output features, such as CPU utilization and/or whether CPU saturation is reached (yes/no), based on values of input features, such as column cardinality, selectivity and indexing, associated with a new SQL query. Such an integrated model may be derived as "Model 2" using the processing component 30 of the database system 20 in the production environment 10 of the system of FIG. 1 and/or the method 300 of FIG. 3, as described above.

The method 800 starts at step 805. At step 810, the method receives a new database query. For example, the query may comprise a new SQL query as described above in relation to step 210, written by an application developer for use in a database in a production environment. At step 820, the method determines the columns C1 to Cn accessed by the query. For example, as with steps 220 and 320 of the methods of FIGS. 1 and 3, step 820 may use a conventional SQL query decomposer, which processes the SQL query and determines the columns C1 to Cn associated with the query.

At step 830, the method receives the integrated model, Model 2. For example, Model 2 may be determined by monitoring a database system in the production environment using the method of FIG. 3 as described above, and received over a communications network from the production environment. As the skilled person will appreciate, Model 2 may be provided in other forms such as on a computer readable storage medium that may be received by the application developer for uploading to the test/development environment.

At step 840, the method applies Model 2 to the new query and determines at least one output as a performance prediction. For example, step 840 determines values of input features for Model 1 and knee of curve forecasting (e.g., features (i), (ii) and (iii)) and determines values of respective output features (e.g., features (iv) and (v) above). The output feature values of each technique may be weighted and combined, selected between, or otherwise combined, according to the query (e.g., based on the columns C1 to Cn accessed by the query) to provide an output as a performance prediction for Model 2.

At step 850, the method stores the output of Model 1 as the performance prediction, such as the predicted value(s) for (iv) CPU utilization and (v) whether CPU saturation is reached (yes/no), which may be used by the application developer to accurately determine the performance impact of the new query, as described above. The method then ends at step 855.

As the skilled person will appreciate, and as explained above, the use of the replica database in the test/development environment for the method for performance prediction is not needed.

Figure 9:
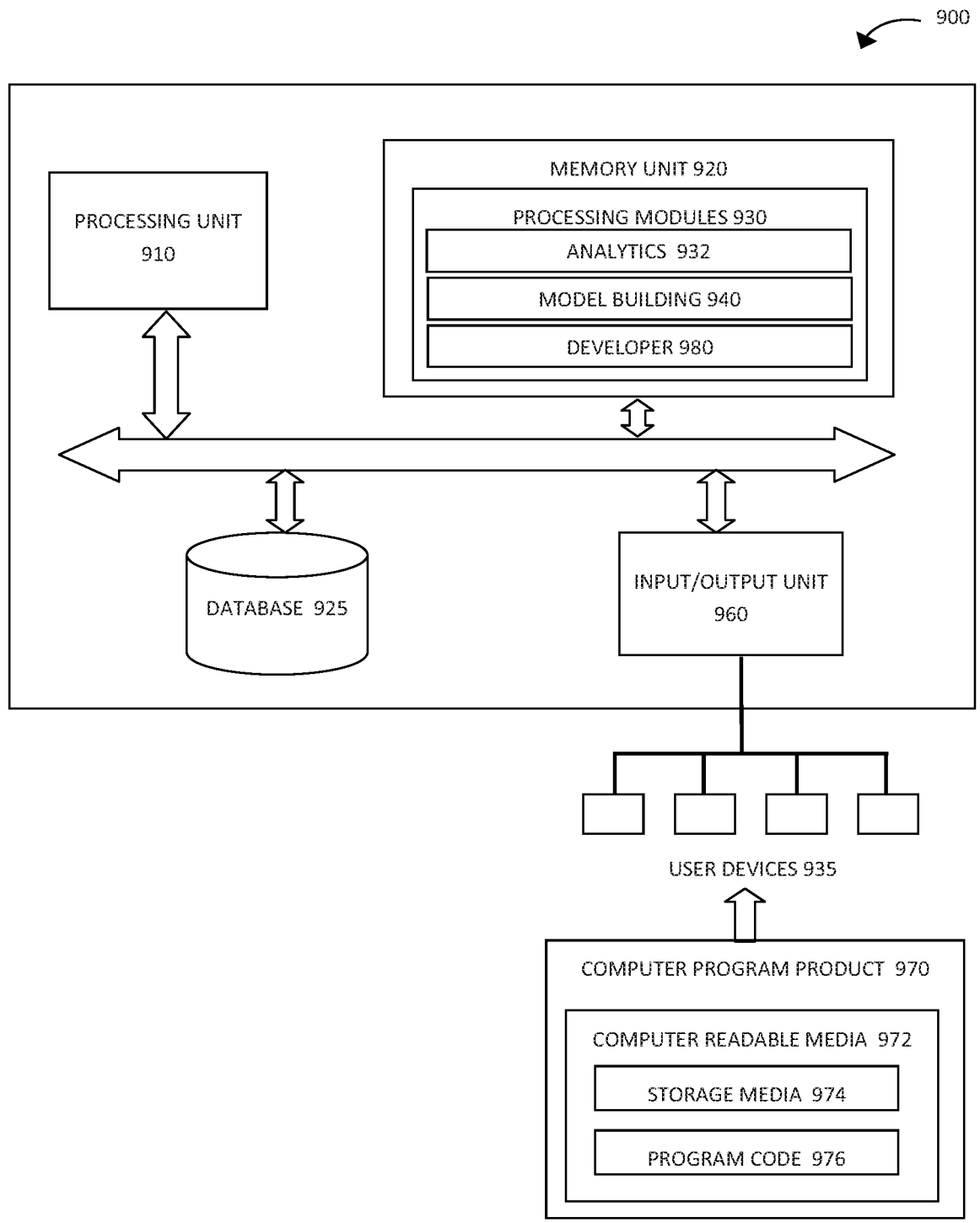
FIG. 9 is a block diagram of a system according to example implementations of the present disclosure.

FIG. 9 is a block diagram of a system 900 according to example implementations of the present disclosure. In particular, system 900 may be used as the database system 20 in the production environment 10 of the system of FIG. 1 and/or for implementing the method 200 of FIG. 2 and/or the method 300 of FIG. 3 and/or steps 710 to 760 of the method 700 of FIG. 7, as described above. Furthermore, system 900 may be used as the test/development system 60 in the test/development environment 50 of the system of FIG. 1 and/or for implementing steps 770 to 790 of the method 800 or the method 800 of FIG. 8, as described above.

System 900 comprises a processing unit 910, in communication with a memory unit 900 and a database 925. The processing unit 910 may be configured to perform steps of the above-described methods. For example, memory unit 920 may store processing modules 930 including processor-executable code for performing steps of the method of FIG. 2 and/or FIG. 3 and/or steps 710 to 760 of the method of FIG. 7, as described above. Memory unit 920 may store processing modules 930 including processor-executable code for performing steps 770 to 790 of the method of FIG. 7 or the steps of the method of FIG. 8, as described above. The system 900 further includes an input/output unit 960 for communicating data to and/or from user devices 935 such as a computer, laptop, tablet or any other suitable processing device for accessing a database (e.g., by running a client database application). Optionally, input/output unit 960 may allow the system 900 to be in communication with a communications network such as the Internet.

The processing modules 930 stored in memory unit 920 may include an analytics module 932 for monitoring the performance of the database 925 in response to queries. For example, analytics module 932 may be configured to perform conventional database system monitoring and analysis, for example as in step 230 of the method 200 of FIG. 2, step 330 of the method 300 of FIG. 3 or one or more of step 710 to 740 of the method 700 of FIG. 7.

In example implementations in a production environment, the processing modules 930 stored in memory unit 920 may also include a model building module 944 providing a model of the database system as described above. For instance, model building module 940 may be used as the model building component 40 (comprising Model 1 subcomponent 42 and/or Model 2 subcomponent 44) of the database system 20 in the production environment 10 of the system of FIG. 1. Thus, model building module 940 may be configured to provide a first model (Model 1) as in the method 200 of FIG. 2 (e.g., step 250) and/or may be configured to provide a second model (Model 2), for example as the method 300 of FIG. 3 (e.g., steps 350, 360 and 370). Model building module 940 may be configured to provide knee of curve formulae, as in the method of FIG. 7 (e.g., steps 710 to 760).

In example implementations in a test/development environment, the processing modules 930 stored in memory unit 920 may also include a developer subcomponent 980. For instance, developer subcomponent 980 may be used as the developer subcomponent 80 of the test/development system 60 in the production environment 50 of the system of FIG. 1. Thus, developer subcomponent 980 may be configured to apply a model in order to provide a model output as a performance prediction for a new database query, for example as in the method 800 of FIG. 7 (steps 830, 840 and 850).

In example implementations of the present disclosure, a computer program product 970 may be provided, as shown in FIG. 9. The computer program product 970 includes a computer readable media 972 having storage media 974 and program instructions 976 (i.e., program code) embodied therewith. The program instructions 976 may be loaded onto the memory unit 920, for example as one or more of the above-described processing modules 930. The program instructions 976 are executable by the processor unit 910 to perform steps of above-described methods. In example implementations for use in a test/development environment, the computer program product 970 may further include a model (e.g., Model 1 and/or Model 2 described above) of a database system in a production environment for use with the program instructions 976, and/or knee of curve formulae for a plurality of selectivity values for use with the program instructions 976.

The above description relates to determining CPU utilization and/or whether CPU saturation is reached during execution of database queries. However, as the skilled person will appreciate, the present disclosure may be used in relation to other types of operations and transactions executed by database and similar systems. Moreover, the present disclosure may be used in relation to utilization of other types of system resource such as memory, bandwidth etc.

Methods according to the present disclosure allow the prediction of CPU utilization and/or whether CPU saturation is reached when executing a query of a database in a production environment. As discussed above, this enables an application developer working in the test/development environment to accurately predict performance of the database in the production environment when executing a new query, without having access to the production database. This provides a number of technical benefits. First, the application developer is able to identify when a new query is likely to lead to performance problems when deployed in the production environment, and to rewrite or otherwise refine the query to reduce the likelihood of such performance problems. Secondly, the application developer may associate conditions with the new query, for deployment in the production environment, for the purpose of database workload management. For example, the application developer may define conditions that indicate whether, when and for what length of time the query may be executed in the production environment. Thus, a condition may allow the query to be executed only during low workload periods of the database, such as overnight. Another condition may allow the query to be executed for a maximum threshold run time, and to stop execution if the query does not complete before the threshold is reached. Other conditions for database workload management are possible and contemplated by the present disclosure. Thirdly, the application developer may use the predicted performance of the database to identify new design requirements for the database in the production environment. For example, an increase in the size of the database system, such as the amount of processing resources (e.g., number of CPUs), memory resources (e.g., number of disks) and communication resources (e.g., network speed and bandwidth), may be required to execute a new customer workload associated with the query within a suitable time period. Similarly, the predicted performance of the database for a customer's new and existing queries may be used in capacity planning for the database system. For example, an upgrade (or downgrade) of the existing system may be required based on an expected change to the customer workload associated with all of the queries of a new database client application.

The present disclosure encompasses a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some example implementations, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to example implementations of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various example implementations of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various example implementations of the present disclosure have been presented for purposes of illustration, but are not intended to be exhaustive or limited to the implementations disclosed. Many modifications and variations will be apparent to those of ordinary skill in the art without departing from the scope and spirit of the described implementations. The terminology used herein was chosen to best explain the principles of the example implementations, the practical application or technical improvement over technologies found in the marketplace, or to enable others of ordinary skill in the art to understand the implementations disclosed herein.

What is claimed is:

1. A method, in a data processing system comprising a processor and a memory coupled to the processor, for determining a predicted performance of a database, the method comprising:
   determining, by the processor, a first model for the database using machine learning and training data based on monitoring the database operating in a production environment;
   determining, by the processor, a second model for the database, wherein the second model combines the first model and a knee of curve formula for the database, wherein the knee of curve formula comprises a plurality of characteristic curves with each characteristic curve indicating CPU utilization versus a number of database rows of the database based on a different column index selectivity value for a query of the database, and wherein the different column index selectivity value is a measure of the different values available in a column associated with the different column index selectivity value; and
   storing, by the processor, the second model for use in determining the predicted performance of the database in response to a database query.

2. The method of claim 1, wherein the training data comprises values of predefined model input features and model output features determined by monitoring the database when executing database queries in the production environment.

3. The method of claim 2, wherein, for each database query:
   the model input features comprise one or more of: cardinality, selectivity, column indexing, column count for columns accessed, row count for rows returned, table density, subquery count, selection predicates count, where clause predicates count, join predicates count, sort columns count, or aggregation columns count; and
   the model output features comprise one or more of: CPU utilization or whether CPU saturation is reached.

4. The method of claim 1, further comprising:
   applying, by the processor, the first model to a database query of the database to determine a predicted output feature value for the first model;
   comparing, by the processor, the predicted output feature value for the first model with an equivalent actual feature value determined by monitoring the database in the production environment in response to the database query; and
   determining, by the processor, an accuracy of prediction by the first model based on the comparison.

5. The method of claim 4, further comprising:
   determining, by the processor, the second model based on the accuracy of prediction by the first model.

6. The method of claim 4, further comprising:
   applying, by the processor, the knee of curve formula for the database to the database query for determining a predicted output feature value for knee of curve forecasting;
   comparing, by the processor, the predicted output feature value for knee of curve forecasting with an equivalent actual feature value determined by monitoring the database in the production environment in response to the database query; and
   determining, by the processor, an accuracy of prediction by the knee of curve forecasting based on the comparison.

7. The method of claim 6, wherein applying the knee of curve formula for the database to the database query uses the selectivity of a column indexed by the database query.

8. The method of claim 6, further comprising:
   determining, by the processor, the second model based on the accuracy of prediction by the first model, the accuracy of prediction by the knee of curve forecasting, or both.

9. The method of claim 1, further comprising:
   determining, by the processor, the second model by combining the first model and the knee of curve formula for the database according to respective weights, wherein the weights for the first model and the knee of curve formula are determined based on an accuracy of prediction of database performance, in response to a database query, by the first model and knee of curve forecasting, and a column indexed by the database query.

10. The method of claim 1, further comprising:
    determining, by the processor, a predicted performance of the database in response to a new database query in a test/development environment, wherein the determining comprises applying the second model to the new database query and wherein the second model applies the first model, the knee of curve formula, or both to the new database query according to the columns indexed by the new database query.

11. A system comprising:
    a processor; and
    a memory coupled to the processor, wherein the memory comprises instructions which, when executed by the processor, cause the processor to:
    determine a first model for a database using machine learning and training data based on monitoring the database operating in a production environment;
    determine a second model for the database, wherein the second model combines the first model and a knee of curve formula for the database, wherein the knee of curve formula comprises a plurality of characteristic curves with each characteristic curve indicating CPU utilization versus a number of database rows of the database based on a different column index selectivity value for a query of the database, and wherein the different column index selectivity value is a measure of the different values available in a column associated with the different column index selectivity value; and
    store the second model for use in determining the predicted performance of the database in response to a database query.

12. The system of claim 11, wherein the instructions further cause the processor to:
    monitor the database when executing database queries in the production environment to obtain the training data, wherein the training data comprises values of predefined model input features and model output features based on the database monitoring.

13. The system of claim 11, wherein the instructions further cause the processor to:
apply the first model to a database query of the database to determine a predicted output feature value for the first model;
compare the predicted output feature value for the first model with an equivalent actual feature value determined by monitoring the database in the production environment in response to the database query; and
determine an accuracy of prediction by the first model based on the comparison.

14. The system of claim 13, wherein the instructions further cause the processor to:
determine the second model based on the accuracy of prediction by the first model.

15. The system of claim 13, wherein the instructions further cause the processor to:
apply the knee of curve formula for the database to the database query for determining a predicted output feature value for knee of curve forecasting;
compare the predicted output feature value for knee of curve forecasting with an equivalent actual feature value determined by monitoring the database in the production environment in response to the database query; and
determine an accuracy of prediction by the knee of curve forecasting based on the comparison.

16. The system of claim 15, wherein the instructions further cause the processor to:
apply the knee of curve formula for the database using the selectivity of a column indexed by the database query.

17. The system of claim 15, wherein the instructions further cause the processor to:
determine the second model based on the accuracy of prediction by the first model, the accuracy of prediction by the knee of curve forecasting, or both.

18. The system of claim 11, wherein the instructions further cause the processor to:
determine the second model by combining the first model and the knee of curve formula for the database according to respective weights, wherein the weights for the first model and the knee of curve formula are determined based on an accuracy of prediction of database performance, in response to a database query, by the first model and knee of curve forecasting, and a column indexed by the database query.

19. The system of claim 11, wherein the instructions further cause the processor to:
determining a predicted performance of the database in response to a new database query in the test/development environment, wherein the determining comprises applying the second model to the new database query and wherein the second model applies the first model, a knee of curve formula, or both to the new database query according to the columns indexed by the new database query.

20. A computer program product comprising a computer readable storage medium having a computer readable program stored therein, wherein the computer readable program, when executed on a computing device, causes the computing device to:
determine a first model for a database using machine learning and training data based on monitoring the database operating in a production environment;
determine a second model for the database, wherein the second model combines the first model and a knee of curve formulae for the database, wherein the knee of curve formula comprises a plurality of characteristic curves with each characteristic curve indicating CPU utilization versus a number of database rows of the database based on a different column index selectivity value for a query of the database, and wherein the different column index selectivity value is a measure of the different values available in a column associated with the different column index selectivity value; and
store the second model for use in determining the predicted performance of the database in response to a database query.

* * * * *